US010956868B1

(12) United States Patent
Cronan

(10) Patent No.: US 10,956,868 B1
(45) Date of Patent: Mar. 23, 2021

(54) VIRTUAL REALITY COLLABORATIVE WORKSPACE THAT IS DYNAMICALLY GENERATED FROM A DIGITAL ASSET MANAGEMENT WORKFLOW

(71) Applicant: 5th Kind LLC, Culver City, CA (US)

(72) Inventor: Stephen Cronan, Los Angeles, CA (US)

(73) Assignee: 5th Kind LLC, Culver City, CA (US)

( * ) Notice: Subject to any disclaimer, the term of this patent is extended or adjusted under 35 U.S.C. 154(b) by 0 days.

(21) Appl. No.: 16/915,681

(22) Filed: Jun. 29, 2020

(51) Int. Cl.
  *G06Q 10/10* (2012.01)
  *G06Q 10/06* (2012.01)
  *G06F 21/62* (2013.01)
  *G06F 16/176* (2019.01)
  *G06F 3/0484* (2013.01)
  *G06Q 50/18* (2012.01)

(52) U.S. Cl.
  CPC ......... *G06Q 10/103* (2013.01); *G06F 16/176* (2019.01); *G06F 21/6218* (2013.01); *G06Q 10/06316* (2013.01); *G06Q 10/105* (2013.01); *G06F 3/0484* (2013.01); *G06Q 10/101* (2013.01); *G06Q 50/18* (2013.01)

(58) Field of Classification Search
  CPC .... G06Q 10/06; G06Q 10/103; G06Q 10/101; G06Q 10/06316; G06F 3/011; G06F 16/1774; G06F 3/017; G06F 16/10
  See application file for complete search history.

(56) References Cited

U.S. PATENT DOCUMENTS

| | | | | |
|---|---|---|---|---|
| 5,008,853 A | * | 4/1991 | Bly | G06F 16/1774 715/751 |
| 5,706,452 A | * | 1/1998 | Ivanov | G06Q 10/107 715/751 |
| 5,826,239 A | * | 10/1998 | Du | G06Q 10/06 705/7.26 |
| 5,960,404 A | * | 9/1999 | Chaar | G06F 9/5038 705/7.26 |
| 5,978,836 A | * | 11/1999 | Ouchi | G06Q 10/10 709/203 |

(Continued)

OTHER PUBLICATIONS

FifthKind.com Web Pages Fifth Kind, Mar. 5, 2016, Retrieved from Archive.org Aug. 20, 2020 (Year: 2016).*

(Continued)

*Primary Examiner* — Scott L Jarrett
(74) *Attorney, Agent, or Firm* — Ansari Katiraei LLP; Arman Katiraei; Sadiq Ansari

(57) ABSTRACT

A collaboration system may produce dynamic collaborative experiences with different tools at different times based on pending workflow tasks and users that are collaborating to complete those tasks. The system may obtain a workflow, and may provide, based on first metadata from the workflow, a first set of users with a first experience that includes a first set of tools for collaborative access to a first set of files. The system may change the first metadata to second metadata in response to output resulting from user interactions with the first set of tools or changes to the first set of files resulting from the first set of users using the first set of tools. The system may provide, based on the second, a second set of users with a second experience that includes a second set of tools for collaborative access to a second set of files.

20 Claims, 8 Drawing Sheets

(56) References Cited

U.S. PATENT DOCUMENTS

| | | | | |
|---|---|---|---|---|
| 6,088,679 | A * | 7/2000 | Barkley | G06Q 10/06311 705/7.26 |
| 6,606,740 | B1 * | 8/2003 | Lynn | G06Q 10/06 717/100 |
| 6,622,162 | B2 * | 9/2003 | Kawasaki | G06Q 10/10 709/207 |
| 6,985,886 | B1 * | 1/2006 | Broadbent | G06Q 10/10 340/5.41 |
| 7,107,549 | B2 * | 9/2006 | Deaton | G06F 3/04815 715/836 |
| 7,386,797 | B1 * | 6/2008 | Chatterjee | G06Q 10/06 715/751 |
| 7,720,905 | B1 * | 5/2010 | O'Connell, Jr. | G06Q 10/06 709/202 |
| 7,761,591 | B2 * | 7/2010 | Graham | G06Q 40/02 709/233 |
| 7,831,978 | B2 * | 11/2010 | Schaad | G06Q 10/06316 718/106 |
| 7,848,984 | B1 * | 12/2010 | Robb | G06Q 40/06 705/36 R |
| 7,900,152 | B2 * | 3/2011 | Nielsen | G06Q 10/10 715/764 |
| 8,028,239 | B1 * | 9/2011 | Al-Hilali | G06F 9/451 715/762 |
| 8,073,762 | B2 * | 12/2011 | Sheth | G06Q 30/0641 705/37 |
| 8,286,257 | B2 * | 10/2012 | Carney | G06F 21/6218 726/28 |
| 8,423,394 | B2 * | 4/2013 | Kogan | G06Q 10/063114 705/7.15 |
| 8,683,353 | B2 * | 3/2014 | Buhrke | G06Q 10/10 715/757 |
| 8,744,246 | B2 * | 6/2014 | Dufosse | G06Q 10/06311 386/326 |
| 8,935,334 | B2 * | 1/2015 | Hon | G06F 16/44 709/205 |
| 9,342,272 | B2 * | 5/2016 | Tattrie | G06F 8/30 |
| 9,519,526 | B2 * | 12/2016 | Ghods | G06F 9/541 |
| 9,842,312 | B1 * | 12/2017 | Rosati | G06Q 10/063114 |
| 10,430,147 | B2 * | 10/2019 | Vembar | G06F 3/147 |
| 10,657,716 | B2 * | 5/2020 | Clausen | G06T 19/003 |
| 10,691,639 | B1 * | 6/2020 | Cronan | G06F 16/13 |
| 10,708,204 | B1 * | 7/2020 | Jalil | H04L 51/046 |
| 2002/0161603 | A1 * | 10/2002 | Gonzales | G06Q 10/10 709/205 |
| 2002/0188678 | A1 * | 12/2002 | Edecker | H04L 29/12066 709/204 |
| 2003/0078975 | A1 * | 4/2003 | Ouchi | G06Q 10/10 709/205 |
| 2004/0025048 | A1 * | 2/2004 | Porcari | G06Q 50/184 726/1 |
| 2004/0122696 | A1 * | 6/2004 | Beringer | G06F 16/2428 705/301 |
| 2004/0135820 | A1 * | 7/2004 | Deaton | G06F 16/9577 715/848 |
| 2005/0027585 | A1 * | 2/2005 | Wodtke | G06Q 10/06316 705/7.26 |
| 2005/0216429 | A1 * | 9/2005 | Hertz | G06Q 10/06 |
| 2006/0161604 | A1 * | 7/2006 | Lobo | G06F 16/958 |
| 2006/0179076 | A1 * | 8/2006 | Weber | G06Q 10/00 |
| 2006/0195484 | A1 * | 8/2006 | Mahesh | G16H 40/20 |
| 2006/0277089 | A1 * | 12/2006 | Hubbard | G06Q 10/0633 705/7.13 |
| 2007/0050467 | A1 * | 3/2007 | Borrett | G06Q 10/10 709/213 |
| 2007/0067728 | A1 * | 3/2007 | Lo | G06Q 10/10 715/751 |
| 2007/0220102 | A1 * | 9/2007 | Bogoch | G06Q 10/10 709/217 |
| 2007/0271517 | A1 * | 11/2007 | Finkelman | G06Q 50/18 715/742 |
| 2009/0157570 | A1 * | 6/2009 | Pall | G06F 21/6218 706/11 |
| 2009/0234721 | A1 * | 9/2009 | Bigelow | G06Q 10/10 705/12 |
| 2009/0254406 | A1 * | 10/2009 | Sichart | G06Q 10/06313 705/7.23 |
| 2009/0307189 | A1 * | 12/2009 | Bobbitt | G06F 16/00 |
| 2011/0307788 | A1 * | 12/2011 | Cheung | G06Q 10/10 715/731 |
| 2011/0320961 | A1 * | 12/2011 | Sriraghavan | H04L 67/38 715/753 |
| 2012/0084256 | A1 * | 4/2012 | Russell | H04L 67/06 707/626 |
| 2013/0124254 | A1 * | 5/2013 | Jafri | G06Q 10/10 705/7.26 |
| 2013/0167039 | A1 * | 6/2013 | Howell | G06F 16/9535 715/748 |
| 2013/0183023 | A1 * | 7/2013 | Sandrew | G11B 27/034 386/286 |
| 2013/0266292 | A1 * | 10/2013 | Sandrew | H04N 9/79 386/282 |
| 2014/0058782 | A1 * | 2/2014 | Graves, Jr. | G06Q 10/06 705/7.23 |
| 2014/0089822 | A1 * | 3/2014 | Wu | G06Q 10/06 715/761 |
| 2015/0026755 | A1 * | 1/2015 | Lehmann | G06F 21/62 726/1 |
| 2016/0232294 | A1 * | 8/2016 | Nuggehalli | G16H 10/60 |
| 2016/0260187 | A1 * | 9/2016 | Rajagopalan | G06Q 40/06 |
| 2016/0328114 | A1 * | 11/2016 | Santhakumar | G06F 9/451 |
| 2017/0293890 | A1 * | 10/2017 | Sanchez Merchan | G06Q 10/103 |
| 2019/0005848 | A1 * | 1/2019 | Garcia Kilroy | G06T 11/00 |
| 2019/0121498 | A1 * | 4/2019 | Jakobovits | G06F 3/0481 |
| 2019/0325771 | A1 * | 10/2019 | Ghatage | G06Q 10/101 |
| 2019/0364081 | A1 * | 11/2019 | Valenzuela | H04L 67/40 |
| 2020/0065889 | A1 * | 2/2020 | Kline | H04W 4/35 |
| 2020/0154059 | A1 * | 5/2020 | Derry | F16M 13/04 |
| 2020/0162254 | A1 * | 5/2020 | Moreno | G06F 16/2379 |

OTHER PUBLICATIONS

FifthKind.com Features Web Pages Fifth Kind, May 13, 2019, Retrieved from Archive.org Aug. 20, 2020 (Year: 2019).*

Extensis Portfolio—Digital Asset Management Best Practices Guide Celartem Inc, Extensis, Feb. 2018 (Year: 2018).*

McKnight, Cathy, Beginner Guide to Digital Asset Management Workflows—A Guide to Getting It Right Digital Clariy Group, 2017 (Year: 2018).*

The Digital Asset Management Buyer's Toolkit Adobe, 2019 (Year: 2019).*

InforImage—Workflow Designer User's Guide Unisys Corporation, 2003 (Year: 2003).*

Monson, Phillip et al., Building a Component for IBM Workplace IBM, 2005 (Year: 2005).*

Mesa News, "5th Kind to Debut CORE's Real-Time Collaboration with Secure Sharing Features", CDSN Content Protection Summit, Apr. 16, 2020, 4 pages, https://www.mesaonline.org/2020/04/16/5th-kind-to-showcase-core-secure-sharing-features-april-21/.

Post Magazine, "5th Kind Helps Aardman Streamline S3D Workflow", Post Magazine, Jan. 1, 2012, 8 pages, https://www.postmagazine.com/Publications/Post-Magazine/2012/January-1-2012/5th-Kind-helps-Aardman-streamline-S3D-workflow.aspx.

Steve Cronan, "M&E Journal: From DAM to Digital Backbone", M&E Connections, Jan. 6, 2016, 4 pages, https://www.mesaonline.org/2016/01/06/me-journal-from-dam-to-digital-backbone/.

Jeff Berman, "NAB Show: 5th Kind Adds Dailies Workflow to CORE Platform (MESA)", Mesa Business, Apr. 5, 2018, 4 pages, https://www.mesaonline.org/2018/04/05/nab-show-5th-kind-adds-dailies-workflow-to-core-platform-mesa/.

Robert Crotty, "M&E Journal: The Progression of Digital Archives", Hollywood IT Society, Feb. 21, 2019, 10 pages, https://www.hollywooditsociety.com/2019/02/21/me-journal-the-progression-of-digital-archives.

(56) References Cited

OTHER PUBLICATIONS

Chris Tibbey, "NAB 2017: 5th Kind to Unveil All-New DAM System", Hollywood IT Society, Apr. 10, 2017, 8 pages, https://www.hollywooditsociety.com/2017/04/10/nab-2017-5th-kind-unveil-new-dam-system.

* cited by examiner

US 10,956,868 B1

VIRTUAL REALITY COLLABORATIVE WORKSPACE THAT IS DYNAMICALLY GENERATED FROM A DIGITAL ASSET MANAGEMENT WORKFLOW

BACKGROUND

Collaboration involves different users advancing a common workflow by working together to complete tasks and/or actions of that workflow. Online collaboration may include providing the users with shared remote access to the workflow resource so that each user may complete different tasks and/or actions on those resources in their respective capacity.

However, online collaboration may not limit or restrict user access to the resources, tasks, and/or actions of a workflow. Some users may contribute where they should not, other users should be prevented from accessing certain confidential or private information, and still other users may lose time determining what resource, tasks, and/or actions to perform and when to perform the tasks and/or actions within a large workflow involving many different business units, user roles, tools, resources, etc.

DETAILED DESCRIPTION OF PREFERRED EMBODIMENTS

The following detailed description refers to the accompanying drawings. The same reference numbers in different drawings may identify the same or similar elements.

Disclosed are systems and methods for customizing online collaborative experiences for efficient workflow execution. A collaboration system may generate and/or provide a plurality of different experiences with different sets of tools at different times and different actionable events for different sets of users depending on what workflow actions or tasks are pending and which users are collaborating to complete those actions or tasks. By providing the different experiences, the collaboration system may facilitate the efficient and secure execution of the workflow.

For instance, the collaboration system may provide different experiences that automatically filter, and thereby restrict, the workflow data and/or resources that are accessible by the different sets of users at the different times, and in doing so, may focus the different sets of users towards the completion of specific workflow tasks or actions. Moreover, the collaboration system may provide the different experiences with different customized tools that further focus the users on the specific tasks or actions that are to be executed at each stage in the workflow. The functionality of the customized tools may also be limited to actionable events that are related to completing the specific tasks or actions. In doing so, the collaboration system of some embodiments may prevent users from losing time determining what tasks or actions to perform, what tools of a generic set of tools to use in performing those tasks or actions, and/or when to perform the tasks or actions using the different customized tools that are presented for the different tasks or actions at the times when those tasks or actions are to be performed.

Figure 1:
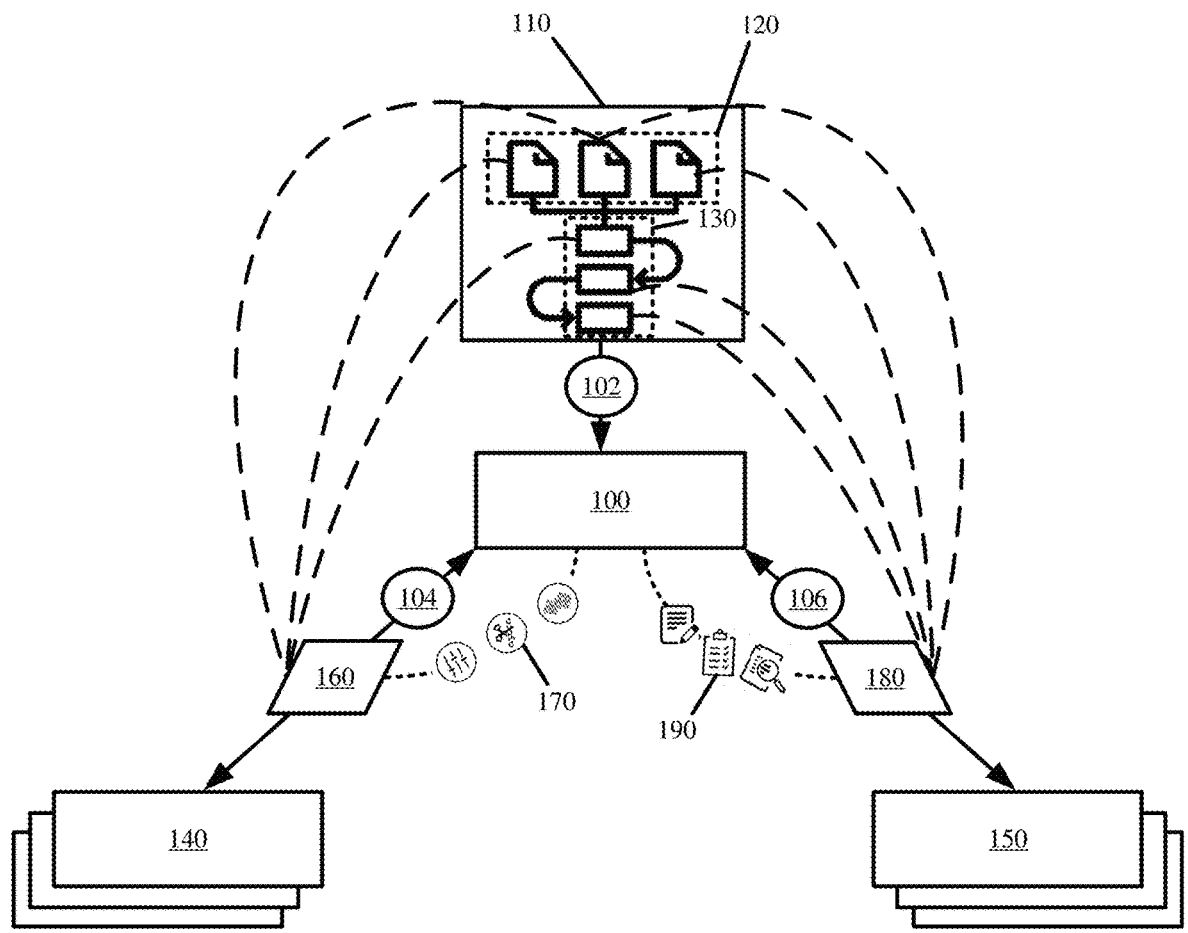
FIG. 1 presents an example of a collaboration system generating different experiences to customize online collaboration for efficient workflow execution in accordance with some embodiments presented herein.

FIG. 1 presents an example of collaboration system 100 generating different experiences to customize online collaboration for efficient workflow execution in accordance with some embodiments presented herein. Collaboration system 100 may receive (at 102) particular workflow 110.

Particular workflow 110 may include one or more resources 120 that are to be modified through tasks and/or actions 130 performed by different sets of users. Resources 120 may include different files or data that different sets of users 140 and 150 may add, modify, edit, revise, share, review, verify, and/or otherwise act on using different tools.

As shown in FIG. 1, particular workflow 110 may include a first set of tasks 130 that require contributions from first set of users 140, and a second set of tasks 130 that require contributions from different second set of users 150. Completion of tasks 130 may be tracked back to resources 120 that store the files and/or data of particular workflow 110.

Sets of users 140 and 150 may include individuals with different roles within a business or enterprise, and/or that specialize in performing different tasks. For instance, sets of users 140 and 150 may include employees of a particular business as well as contractors or third-party service providers that collaborate with the particular business towards completion of particular workflow 110.

Collaboration system 100 may determine that first set of users 140 access particular workflow 110, and may provide (at 104) first set of users 140 with first experience 160. Collaboration system 100 may customize first experience 160 based on the first set of tasks 130 that first set of users 140 are to perform in order to advance particular workflow 110 closer to completion.

For instance, collaboration system 100 may determine that particular workflow 110 specifies at least a creative review and a legal review, and may determine that first set of users 140 perform the creative review. Accordingly, collaboration system 100 may customize first experience 160 by providing first set of users 140 with access to a subset of resources 120 from particular workflow 110 that are related to the creative aspects of particular workflow 110.

Collaboration system 100 may further customize first experience 160 with first set of tools 170 for specifically performing the creative review tasks. For instance, the creative review may include viewing, editing, annotating, mixing, and/or otherwise modifying media content. First experience 160 may therefore include tools 170 for viewing, editing, annotating, mixing, and/or otherwise modifying the media content, and may automatically load and/or playback the media content from particular workflow 110.

Collaboration system 100 may filter the actionable events that may be accessed with first set of tools 170. For instance, collaboration system 100 may enable or activate the actionable events of first set of tools 170 that are for viewing, editing, annotating, mixing, and/or otherwise modifying the media content, and may disable or deactivate other actionable events of first set tools 170. In this manner, collaboration system 100 may customize the set of tools (e.g., first set of tools 170) as well as the actionable events of the customized set of tools that are made available as part of first experience 160. By customizing the actionable events of first set of tools 170, collaboration system 100 is able to keep the first set of users 140 better focused on the pending tasks that need to be executed, and is further able to prevent first set of users 140 from performing unrelated tasks or tasks that are outside the defined part of particular workflow 110.

In some embodiments, collaboration system 100 may customize first experience 160 with instructions, notifications, or other signaling that identifies the tasks and/or actions that first set of users 140 are to perform. The instructions may provide additional guidance and direction to better focus and streamline the tasks and/or actions performed by first set of users 140, thereby resulting in more efficient workflow execution and usage of user time.

At the same time or at a later time, collaboration system 100 may determine that second set of users 150, that are authorized to perform the legal review, access particular workflow 110. In some embodiments, first set of users 140 and second set of users 150 may access different experiences 160 and 180 of particular workflow 110 using the same Uniform Resource Identifier ("URI"), link, and/or another identifier.

Collaboration system 100 may provide (at 106) the second set of users 150 with second experience 180. Once again, collaboration system 100 may customize second experience 180 based on tasks and/or actions that second set of users 150 are to perform in order to advance particular workflow 110 closer to completion. In some embodiments, collaboration system 100 may generate and/or provide (at 106) second experience 180 to second set of users 150 in response to first set of users 140 successfully performing the first set of tasks using the workflow resources and the first set of customized tools provided (at 104) with first experience 160.

Collaboration system 100 may customize second experience 180 to differ from first experience 160. In particular, collaboration system 100 may customize second experience 180 to provide second set of users 150 access to a different subset of resources of particular workflow 110 than the subset of resources made accessible via first experience 160 to first set of users 140. For instance, second experience 180 may provide access to legal files (e.g., contracts, agreements, policies, and/or other legal materials) of particular workflow 110 instead of the media content that was provided via first experience 140.

Collaboration system 100 may also customize second experience 180 to provide (at 106) second set of users 150 with a different customized second set of tools 190 for performing different tasks and/or actions than first set of tools 170 provided with first experience 160, and may customize the actionable events of second set of tools 190 by enabling and disabling certain functionalities or operations of second set of tools 190. For instance, first experience 160 may provide media content playback and editing tools 170, and second experience 180 may provide tools 190 for document viewing and annotation, comparing different revisions of a document, and/or electronically signing a document. By customizing the actionable events of second set of tools 190, collaboration system 100 may prevent second set of users 150 from adding or deleting documents.

In some embodiments, second experience 180 may include a different set of instructions, notifications, or other signaling than first experience 160. Collaboration system 100 may customize the instructions, notifications, or other signaling of second experience 180 according to the pending tasks and/or actions for advancing through the legal review stage of particular workflow 110.

Second experience 180 may therefore focus second set of users 150 on performing and/or completing the legal review tasks without unnecessarily exposing second set of users 150 to any of the media content files or playback and editing tools of first experience 160. Similarly, first experience 160 may focus first set of users 140 on performing and/or completing the creative review tasks without unnecessarily exposing first set of users 140 to any of the legal files or legal review tools of second experience 130.

In this manner, collaboration system 100 may keep each set of users 140 and 150 focused on specific set of tasks and may provide them with customized tools and actionable events for performing those tasks, rather allow all users to collaborate on all resources of particular workflow 110 using all the same tools and all available actionable events of those tools. In other words, first set of users 140 and second set of users 150 may request access to the same particular workflow 110, and collaboration system 100 may customize the virtual environment that each set of users 140 and 150 receives with the customized virtual environment restricting what resources 120 the each set of users 140 and 150 has access to and what tasks can be performed to advance particular workflow 110 based on different sets of tools 170 and 190 made available in each virtual environment. Accordingly, the customized collaboration provided by collaboration system 100 may control and/or restrict different sets of users access to particular workflow 110 so that each set of users can receive the resources (e.g., files and/or data) and tools they need to identify and complete their respective tasks and/or actions without interfering with the tasks and/or actions of other users and other parts of particular workflow 110.

In some embodiments, collaboration system 100 may facilitate a parallel completion of particular workflow 110 by providing (at 104) first experience 160 to first set of users 140 contemporaneous with providing (at 106) second experience 180 to second set of users 150. In some embodiments, collaboration system 100 may facilitate a dynamic or adaptive completion of particular workflow 110 by generating dynamic experiences based on interactions of users with prior experiences.

Experiences 160 and 180 may be different websites that each of first set of users 140 and second of users 150 may remotely access using a common URI, link, and/or identifier. In some embodiments, experiences 160 and 180 may correspond to alternative presentations of the files, data, tools, user access, and/or user interactions. For instance, experiences 160 and 180 may include different virtual reality ("VR"), augmented reality ("AR"), and/or rendered virtual office environments in which teams or groups of users may collaborate as if the different sets of users were physically present in different spaces or rooms for face-to-face collaboration. In some such embodiments, collaboration system 100 may generate experiences 160 and 180 to virtually mirror the look and feel of different collaborative spaces used by different sets of users within a physical office. For instance, collaboration system 100 may customize experiences 160 and 180 with skins, textures, or images that simulate the look of different employee offices, conference rooms, and/or other physical spaces, and may further customize experiences 160 and 180 with interactive tools that mirror the collaborative tools of those physical spaces.

The customized tools included within experiences 160 and 180 may represent whiteboards, screening rooms, editing software and devices, mixing software and devices, imaging software and devices, recording software and devices, conferencing equipment, simultaneous file access, and/or other devices and software. More generally, any tool that may be available for use in a physical collaborative space may be virtualized and presented as an interactive graphical element in the experiences that are generated and provided by collaboration system 100.

The customized actionable events associated with the provided tools may include highlighted or accessible functionality or operations that can be completed using the provided tools. For instance, a first set of actionable events may allow for a document or file to be approved or rejected for a certain task of particular workflow 110, and a second set of actionable events may be enabled upon a user using the first set of actionable events to reject the document file. The second set of actionable events may allow the same document or file to be modified with annotations after the document or file is rejected using the same document or file editing tool, although the functionality of that tool changes based on the enabled actionable events.

Figure 2:
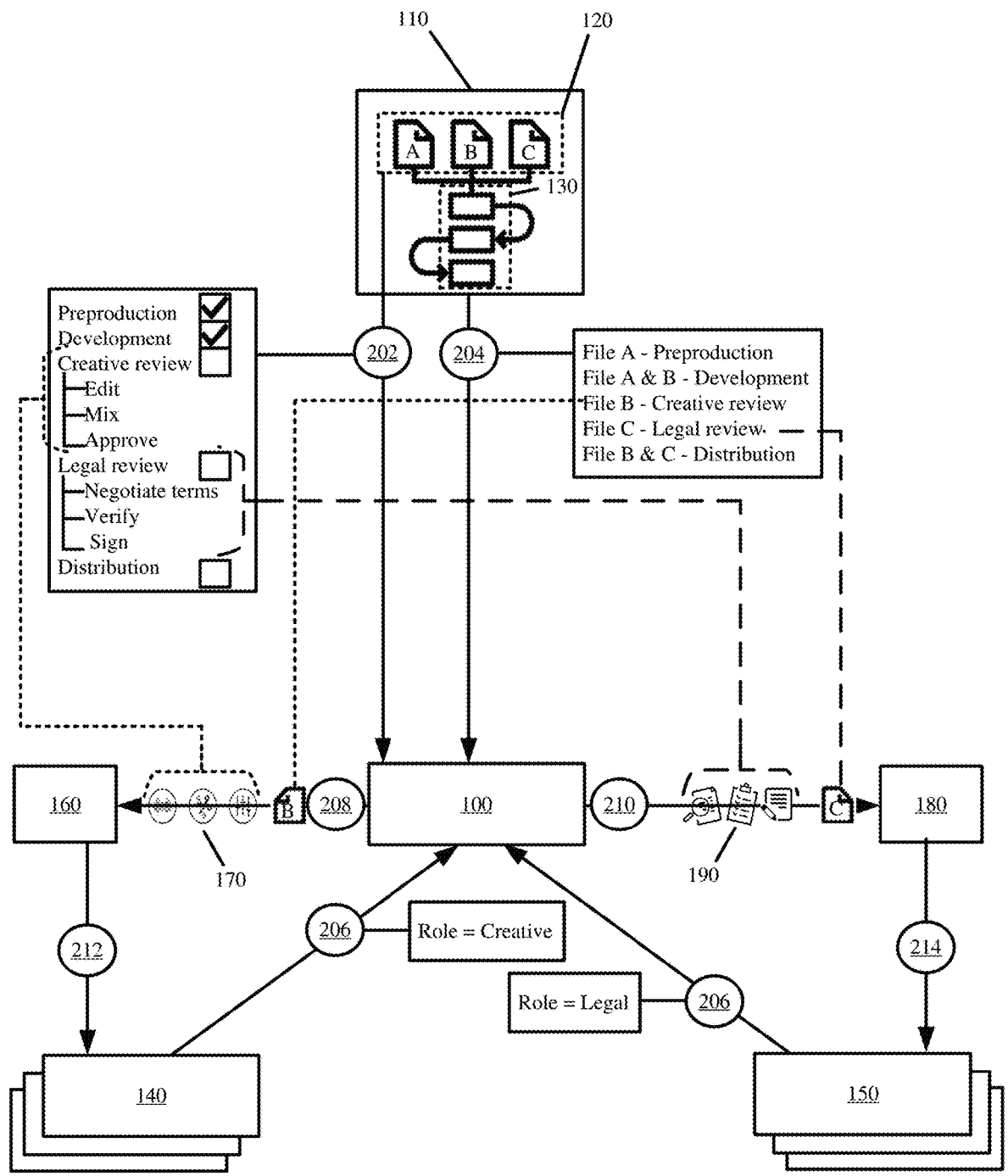
FIG. 2 illustrates an example of the collaboration system generating two experiences based on different metadata in accordance with some embodiments presented herein.

Collaboration system 100 may generate experiences based on a changing set of metadata that is associated with each particular workflow. FIG. 2 illustrates an example of collaboration system 100 generating experiences 160 and 180 based on different metadata in accordance with some embodiments presented herein. As shown in FIG. 2, collaboration system 100 may obtain (at 202, 204, and 206) metadata for one or more of particular workflow 110, resources 120 of particular workflow 110, and different users 140 and 150 that access particular workflow 110.

Particular workflow 110 may include share metadata. The share metadata may define remaining tasks and/or actions of particular workflow 110, tools associated with performing the remaining tasks and/or actions, a state or progression through particular workflow 110, and/or workflow attributes. The workflow attributions may correspond to data that collaboration system 100 may use to customize the generated experiences, the resources (e.g., file and/or data) that are accessible with each experience, and/or user access.

The resource metadata may link certain files or data of particular workflow 110 to certain tasks and/or actions that are to be executed as part of completing particular workflow 110. Stated differently, the resource metadata may indicate what stages or states of particular workflow 110 require certain files or data, and may select those files or data to become accessible at those stages or states of particular workflow 110. The resource metadata may also link certain files or data of particular workflow 110 to certain tools that may be used to interact with or modify those files or data and/or to certain actions that may be performed on those files or data. The resource metadata may also link to certain files or data to certain user roles or user access privileges. Generally, the resource metadata may correspond to file or data attributes that collaboration system 100 may use to customize the generated experiences, the files that are accessible with each experience, and/or user access.

The user metadata may include user identifying data, and may be associated with each user. The user identifying data may include a user role, a user identifier, user access privileges, and/or other user attributes that collaboration system 100 may use to customize the generated experiences, the files that are accessible with each experience, and/or user access.

As shown in FIG. 2, collaboration system 100 may obtain (at 202) share metadata that specifies particular workflow 110 pending the creative review, the legal review, and a distribution. The share metadata may also specify the tasks and actions for performing the creative review, the legal review, and the distribution and/or the tools for performing those tasks and actions.

Collaboration system 100 may obtain (at 204) file metadata that identifies at least a first file for the creative review, at least a second file for the legal review, and the first and second files for the distribution. Although now shown, the file metadata may also specify the set of tools that can be used to certain task and actions on those files.

Collaboration system 100 may use the file metadata, the share metadata, or their combination to determine and/or select the first file and first set of tools 170 from a plurality of tools for performing the tasks and actions of the creative review, and the second file and second set of tools 190 from the plurality of tools for performing the tasks and actions of the legal review. Collaboration system 100 may generate (at 208) first experience 160 with first set of tools 170, and may load, link, or otherwise provide access to the first file via first experience 160. Similarly, collaboration system 100 may generate (at 210) second experience 180 with second set of tools 190, and may load, link, or otherwise provide access to the second file via second experience 180.

Collaboration system 100 may receive requests to access and/or collaborate on particular workflow 110 from first set of users 140 and second set of users 150. In some embodiments, each request may include the user metadata for the specific user originating the request, and collaboration system 100 may obtain (at 206) the user metadata along with each request. In some other embodiments, each request may include a user identifier, and collaboration system 100 may obtain (at 206) the corresponding user metadata based on the user identifier. The user identifier may correspond to a network address, a device signature, user login credentials, and/or other unique user identifying data.

Based on the obtained (at 206) user metadata, collaboration system 100 may determine that first set of users 140 may collaborate on particular workflow 110 using the first files, first set of tools 170 provided with first experience 160, and/or a first set of actionable events of first set of tools 170 that become enabled with first experience 160, and may determine that second set of users 150 may collaborate on particular workflow 110 using the second file, second set of tools 190 provided with second experience 180, and/or a different second set of actionable events of second set of tools 190 that become enabled with second experience 180. Accordingly, collaboration system 100 may provide (at 212) first experience 160 in response to the requests from first set of users 140, and may provide (at 214) second experience 180 in response to the requests from second set of users 150. First set of users 140 may collectively access first experience 160 in order to collaborate and collectively contribute to the execution of the pending creative tasks based on interactions with first set of tools 170 and the enabled first set of actionable events. Second set of users 150 may collectively access second experience 180 in order to collaborate and collectively contribute to the execution of the pending legal tasks based on interactions with second set of tools 190 and the enabled second set of actionable events.

In some embodiments, collaboration system 100 may store the share, file, and/or user metadata with pointers to associate the metadata back to the respective workflow, file, and/or user. In some embodiments, the share metadata may be stored in conjunction with a container or other object that represents the workflow, the file metadata may be stored with or as part of each file, and the user metadata may be provided by the users when accessing the experiences or may be obtained by collaboration system 100 upon users providing access requests, login credentials, or other identifying information.

The metadata may include descriptive data that may be disassociated from the resources (e.g., files or data) being manipulated throughout the workflow execution. For instance, the metadata may be stored in data structures or database records that are apart or disassociated from the files being manipulated throughout the workflow execution.

As noted above, collaboration system 100 may produce an adaptive virtual office environment that changes the provided experiences based on workflow progression. Collaboration system 100 may track the workflow progression by dynamically changing the metadata that is associated with a particular workflow upon completion of different workflow stages. Accordingly, the metadata, and the experiences that are generated based on the metadata, may have dependencies that are affected by earlier user collaboration.

Figure 3:
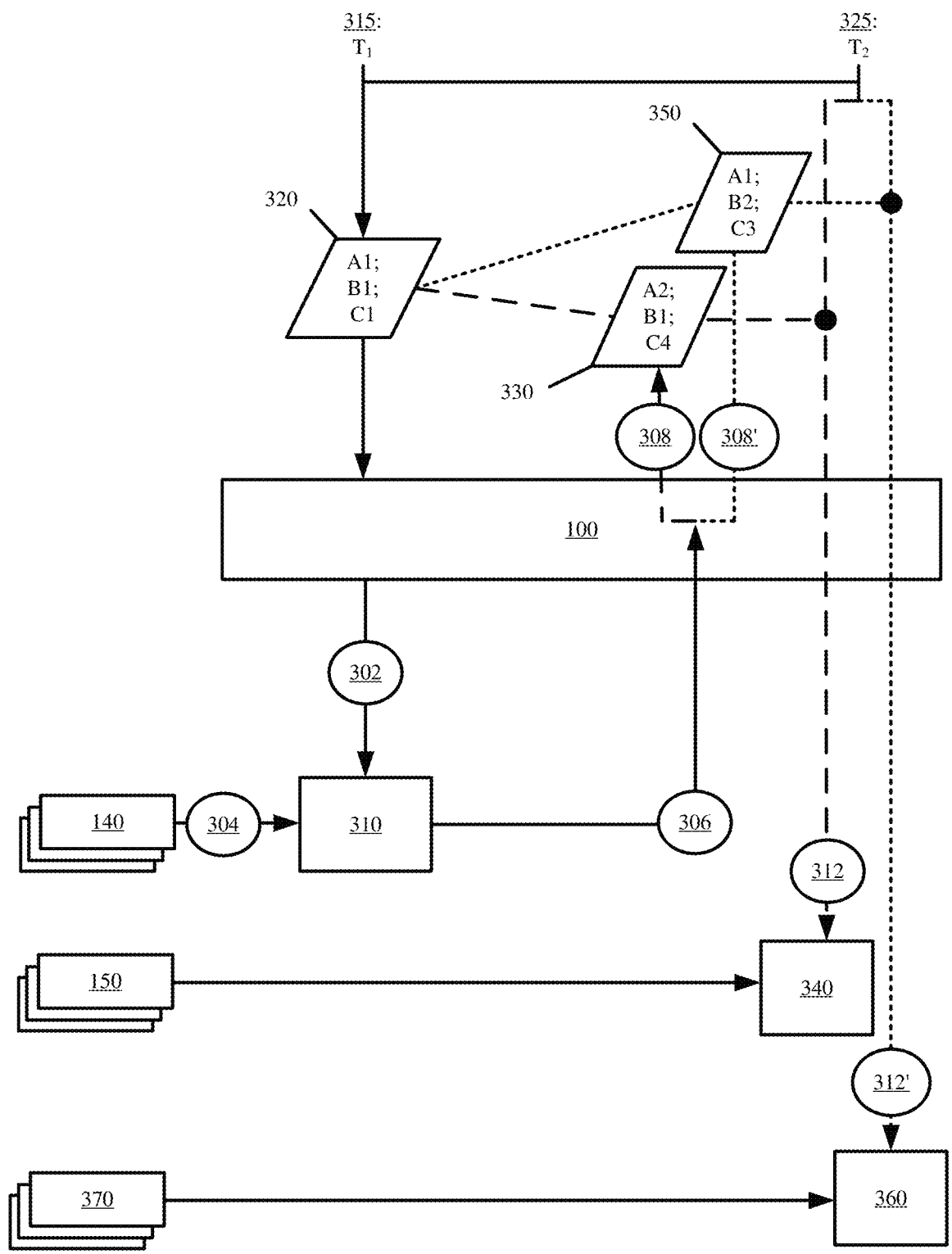
FIG. 3 illustrates an example of the collaboration system dynamically generating experiences in accordance with some embodiments based on metadata that changes in response to user interaction with earlier experiences.

FIG. 3 illustrates an example of collaboration system 100 dynamically generating experiences in accordance with some embodiments based on metadata that changes in response to user interaction with earlier experiences. At first time 315, collaboration system 100 may generate first experience 310 based on first metadata 320 that exists for particular workflow (e.g., share, file, user, and/or metadata) at first time 315. Collaboration system 100 may provide (at 302) first experience 310 to first set of users 140 during first time 315. First experience 310 may provide first set of users 140 access to a first set of files (e.g., media content) and a first set of tools with a first set of enabled actionable events for reviewing creative aspects of the first set of files.

First set of users 140 may access first experience 310 at a particular URL, and may interact (at 304) with the first set of files using the first set of tools when accessing first experience 310 during first time 315. The user interactions may produce (at 306) output that modifies one or more of the first set of files, that changes the particular workflow state, and/or that generates other events associated with the particular workflow.

Collaboration system 100 may modify (at 308) first metadata 320 to second metadata 330 based on a first set of user interactions and/or output that is produced (at 306) by first set of users 140. For instance, first set of users 140 may use the first set of actionable events that are enabled with the first set of tools of first experience 310 to annotate the first set of files with suggested changes and/or identified issues, and/or by using the first set of tools to mark the first set of files as incomplete. In this case, collaboration system 100 may change the share metadata for a state of the particular workflow from "creative review" in first metadata 320 to "editing" in second metadata 330 based on the input provided by first set of users 140. Additionally, or alternatively, collaboration system 100 may detect changes to the first set of content files as a result of the annotations and/or input provided by first set of users 140, and may modify first metadata 320 to second metadata 330 to reflect the changes.

In response to the metadata changing from first metadata 320 to second metadata 330, collaboration system 100 may dynamically generate (at 312) second experience 340 at second time 325. Second experience 340 may provide a virtual editing environment that emulates an actual editing room by including media editing tools and/or by creating a VR environment, AR environment, other virtual room, and/or graphical interface for media content editing. Additionally, collaboration system 100 may configure second experience 340 to link, load, and/or provide access to a second set of files, that may include one or more of the first set of files. Collaboration system 100 may then provide different second set of users 150 access to second experience 340 based on second metadata 330 (e.g., changing the share metadata from "creative review" to "editing" and/or other metadata changes) resulting from first set of users 140 accessing first experience 310. Collaboration system 100 may provide a notification to second set of users 150 to instruct them to access second experience 340 and/or perform a set of editing tasks and/or actions.

Alternatively, first set of users 140 may perform the creative review of the first set of files using the first set of tools from first experience 310, and may produce (at 306) different output as a result of a different set of user interactions with first experience 310. For instance, first set of users 140 may interact with first experience 310 to mark the first set of files as complete and requiring no additional edits or changes. In this case, collaboration system 100 may modify (at 308') first metadata 320 to third metadata 350 based on the second set of user interactions and/or output that is produced (at 306) by first set of users 140. For instance, third metadata 350 may change a state of the particular workflow from "creative review" to "marketing" and/or may change other metadata based on the input that is provided by first set of users 140 via first experience 310.

In response to the metadata changing from first metadata 320 to third metadata 350, and not second metadata 330, collaboration system 100 may dynamically generate (at 312') third experience 360 at second time 325. Third experience 360 may provide a virtual environment for generating a marketing plan. For instance, the first set of files may include a first file with actors acting, a second file with special effects, and a third file with music, and the third set of files may include a final render or mix of the first, second, and third files from the first set of files and another file with different advertising campaigns generated from the final render. Accordingly, third experience 360 may include tools for third set of users 370 to video conference, enter suggestions on a collaborative whiteboard or shareable document, link the suggestions to snippets within the media content, and/or generate promotional campaigns for different advertising formats (e.g., television advertising, social media advertising, print advertising, etc.). Collaboration system 100 may configure third experience 360 to link, load, and/or provide access to the third set of files, and may provide third set of users 370 access to third experience 360 based on third metadata 350 (e.g., changing the share metadata from "creative review" to "marketing" and/or other metadata changes) resulting from first set of users 140 accessing first experience 310. Third set of users 370 may include one or more users that are different from first set of users 140 and second set of users 150, although one or more of the same users may be included in two or more of first, second, and third sets of users (e.g., a manager, executive, etc.). Collaboration system 100 may provide a notification to third set of users 370 to instruct them to access third experience 360, and/or to perform a set of tasks and/or actions to promote the finalized media content.

In some embodiments, collaboration system 100 may provide different sets of users simultaneous access to different experiences, and may dynamically generate subsequent experiences based on the collective metadata changes that result from two or more of the earlier generated experiences. In some embodiments, one or more of the tools and/or actionable events provided with the different experiences may directly change the share, file, user, and/or other metadata. For instance, first experience 310 may include a first interactive graphical element for accepting the media content as complete, and a second interactive graphical element for rejecting the media content as incomplete or pending additional edits. Selection of the first interactive graphical element by one or more of the first set of users may change the share metadata from "creative review" to "editing" (e.g., change from first metadata 320 to second metadata 330), and selection of the second interactive graphical element by one or more of the second set of users may change the share metadata from "creative review" to "marketing" (e.g., change from first metadata 320 to third metadata 350). In some embodiments, one or more of the provided tools may indirectly change the metadata by changing properties of the shared collaborative workflow, files of the workflow, and/or users attributes.

In some embodiments, collaboration system 100 may change metadata based on time or other events that may be external to the workflow. For instance, if a generated advertising campaign does not reach a certain number of views, viewing time, clicks, impressions, etc. by a certain time, collaboration system 100 may automatically change the metadata for the workflow associated with that advertising campaign or another advertising campaign. The resulting metadata changes may cause collaboration system 100 to generate a dynamic experience for changing an advertising campaign in development in order to differentiate from the unpopular advertising campaign.

Figure 4:
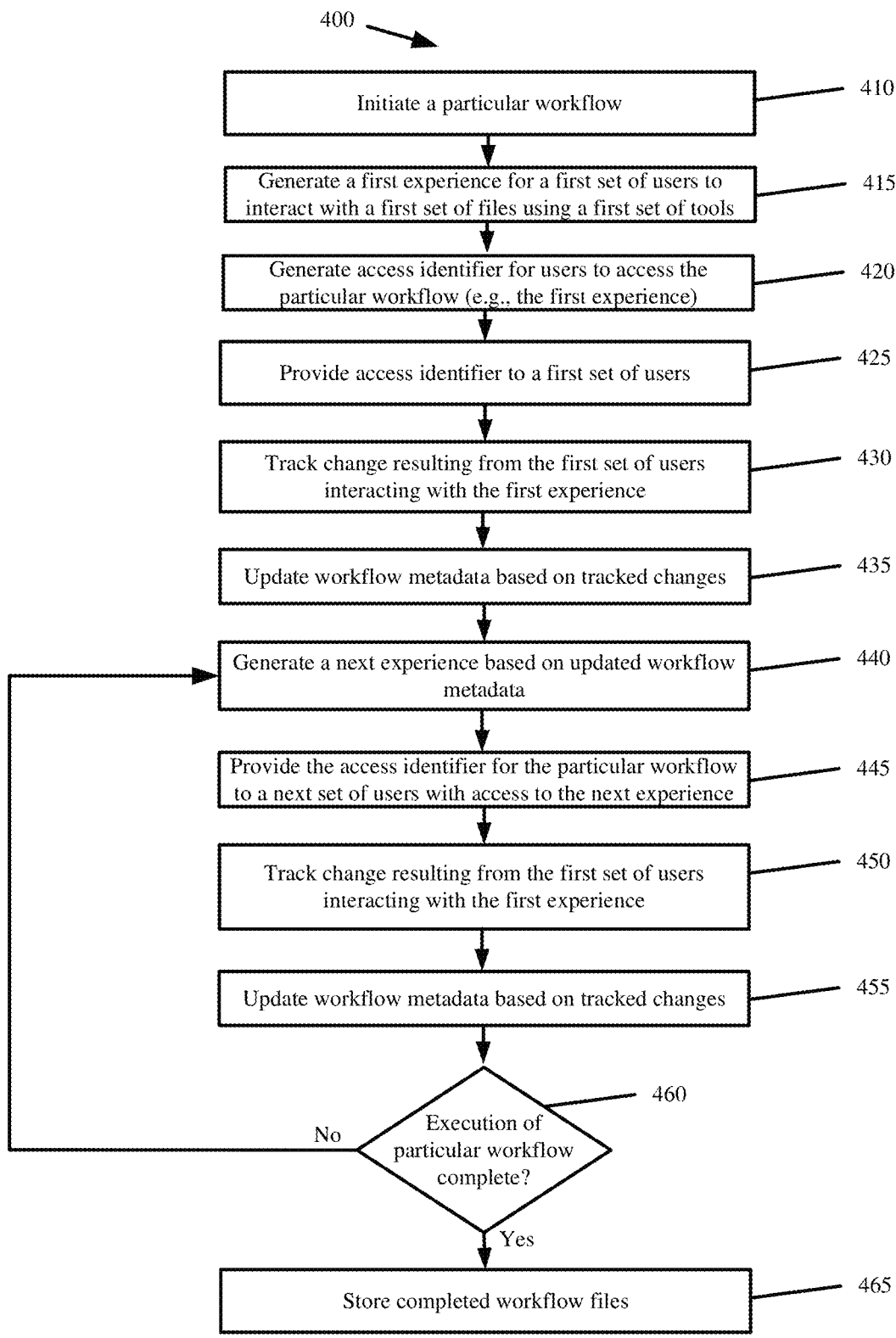
FIG. 4 presents a process for dynamically generating different experiences based on changing metadata in accordance with some embodiments presented herein.

FIG. 4 presents a process 400 for dynamically generating different experiences based on changing metadata in accordance with some embodiments presented herein. Process 400 may be implemented by collaboration system 100 for any of a plurality of different workflows.

Process 400 may include initiating (at 410) a particular workflow. The particular workflow may comprise one or more files that different sets of users may access in the performance of various tasks and/or actions of the particular workflow. Each workflow may be partially or wholly predefined with metadata defining a list of tasks and/or actions that are required to complete that workflow. Each workflow may also be defined with metadata that specify which sets of users are able to access which files and perform which tasks and/or actions at different stages in the workflow. In some embodiments, collaboration system 100 may be configured with rules that map the workflow metadata (e.g., one or more of the share, file, user, and/or other metadata) to different tasks and/or actions awaiting execution, different files on which the tasks and/or actions are to be performed, and/or different users for performing those tasks and/or actions. For instance, a business may follow the same workflow to release different products, may define a metadata taxonomy to represent the different workflow states, may define the tasks and/or actions to be performed to advance between each state, may define the files for each workflow state, and/or may define which users may be involved at the different states. Collaboration system 100 may then be configured with the workflow definition, and the metadata taxonomy.

Process 400 may include generating (at 415) a first experience for completing a first stage of the particular workflow based on the current set of metadata that is associated with the particular workflow. Collaboration system 100 may generate (at 415) the first experience to provide a first set of tools with an enabled first set of actionable events that a first set of users may use to perform a first set of tasks and/or actions for a first stage of the particular workflow. In particular, collaboration system 100 may select the first set of tools from a plurality of available tools, and may populate the first experience with the first set of tools based on the current set of metadata. Collaboration system 100 may then select which actionable events of the first set of tools to enable (e.g., permit user access) and which actionable events of the first set of tools to disable (e.g., prevent user access) based on the current set of metadata and/or the pending tasks. In some embodiments, the metadata may map or may identify the first set of tools by identifying the particular workflow state or by identifying the next set of tasks and/or actions of the particular workflow. In some embodiments, the metadata may identify which users may access the first experience based on a mapping of the metadata to different user roles or identifiers.

Process 400 may include generating (at 420) a URI, link, and/or other access identifier for accessing the particular workflow. In some embodiments, the same URI, link, and/or other access identifier may be used by different sets of users to access different experiences generated by collaboration system 100 for that particular workflow.

Collaboration system 100 may restrict access to the different experiences based on the user metadata of the users requesting access to the particular workflow. For instance, if a user of a different second set of users attempts to access the particular workflow when only the first experience is active, collaboration system 100 may obtain the metadata that identifies the user's roles, access privileges, and/or other identifying user information, and may deny that user access to the first experience because the user is determined to not be within the first set of users. If collaboration system 100 had generated an active second experience for the particular workflow at the same time as the active first experience, and the second experience was accessible by the second set of users, then collaboration system 100 may allow the user access to the second experience but not the first experience in response to a request directed to the URI, link, and/or other access identifier.

Process 400 may include providing (at 425) the access identifier to the first set of users. For instance, collaboration system 100 may provide an email, text message, instant message, telephone call, and/or other notification to devices of the first set of users. The notification may alert the first set of users of pending tasks and/or actions of the particular workflow, and/or the access identifier for accessing an active experience of the particular workflow (e.g., the first experience) with which to complete the tasks and/or actions.

In some embodiments, collaboration system 100 may initiate a set of timers after providing (at 425) the access identifier. Collaboration system 100 may monitor the timers to determine whether the first set of users have accessed the first experience and/or performed any of the first set of tasks and/or actions. If a timer expires before completion of the first set of tasks and/or actions, collaboration system 100 may provide reminders to the first set of users.

Process 400 may include tracking (at 430) change produced by the first set of users using the first experience. For instance, collaboration system 100 may receive output as a result of user interactions with the first set of tools provided with the first experience. These changes may correspond to changes in the state or attributes of the particular workflow. Collaboration system 100 may also track (at 430) change to the first set of files based on user interactions with those files when accessed through the first experience.

Process 400 may include updating (at 435) the particular workflow metadata in response to tracking (at 430) the change resulting from user interactions with the first experience. The updating (at 435) of the particular workflow metadata may include updating share, file, user, and/or other metadata associated with the particular workflow. In some embodiments, the changes may directly map to metadata changes. For instance, input that changes the particular workflow state from "review" to "complete" may be directly captured within the metadata. In other words, a user may select a graphical user element within the first experience that directly changes specific workflow metadata. In some other embodiments, collaboration system 100 may map the changes produced via the first experience to different metadata changes. For instance, collaboration system 100 may change metadata from a "review" state to an "editing" state in response to the first set of users adding annotations to one or more of the first set of files using the first set of tools from the first experience.

Process 400 may include generating (at 440) at least a second experience to further advance progression of the particular workflow based on the updated (at 435) metadata. Collaboration system 100 may determine the state of the particular workflow based on the metadata changes, may determine new tasks and/or actions that are pending based on the results of the tasks and/or actions performed via the first experience, may select different sets of tools for the second experience based on the new tasks and/or actions that are pending and/or the metadata changes, and/or may determine a second set of users for accessing the second experience in order to perform the new tasks and/or actions.

In some embodiments, collaboration system 100 may generate (at 440) multiple new experiences based on the metadata changes that occurred as a result of the user interactions with the first experience. For instance, collaboration system 100 may generate (at 440) a second experience with a second set of tools for a second set of users to perform a second set of tasks of the particular workflow, and a third experience with a third set of tools for a third set of users to perform a third set of tasks of the particular workflow based on the metadata changes that occurred as a result of the user interactions with the first experience and/or output resulting therefrom.

By generating (at 440) multiple experiences that can be accessed by different users at the same time, collaboration system 100 may allow for parallelized execution of different independent stages of the particular workflow, thereby reducing the overall time to complete the particular workflow. In other words, collaboration system 100 may facilitate a parallel execution of the particular workflow via different sets of users accessing different experiences at the same time in order to simultaneously perform different sets of tasks and/or actions of the particular workflow rather than complete the sets of tasks and/or actions through a slower serial execution.

Process 400 may include providing (at 445) the access identifier for the particular workflow to a next set of users with access to the next or second experience. Collaboration system 100 may also provide the next set of users notification of the new tasks and/or actions for the particular workflow.

In response to requests that are directed to the access identifier and that are issued after generating the next or second experience, collaboration system 100 may provide authorized users access to the next or second experience, and may restrict unauthorized users from accessing the next or second experience and/or all users from accessing the first experience when the first set of tasks and/or actions associated with the first experience are complete.

Process 400 may include tracking (at 450) the changes resulting from user interactions with one or more newly generated experiences, and updating (at 455) the particular workflow metadata based on the tracked (at 450) changes. Process 400 may also include determining (at 460) whether execution of the particular workflow is complete.

In response to determining (at 460—Yes) that the particular workflow is complete, process 400 may include storing the particular workflow files in a directory, repository, or other container, and/or providing notice to a workflow administrator. In response to determining (at 460—No) that the particular workflow is incomplete, process 400 may continue generating (at 440) additional experiences to control and/or direct the users towards an efficient and focused execution of the particular workflow.

Figure 5:
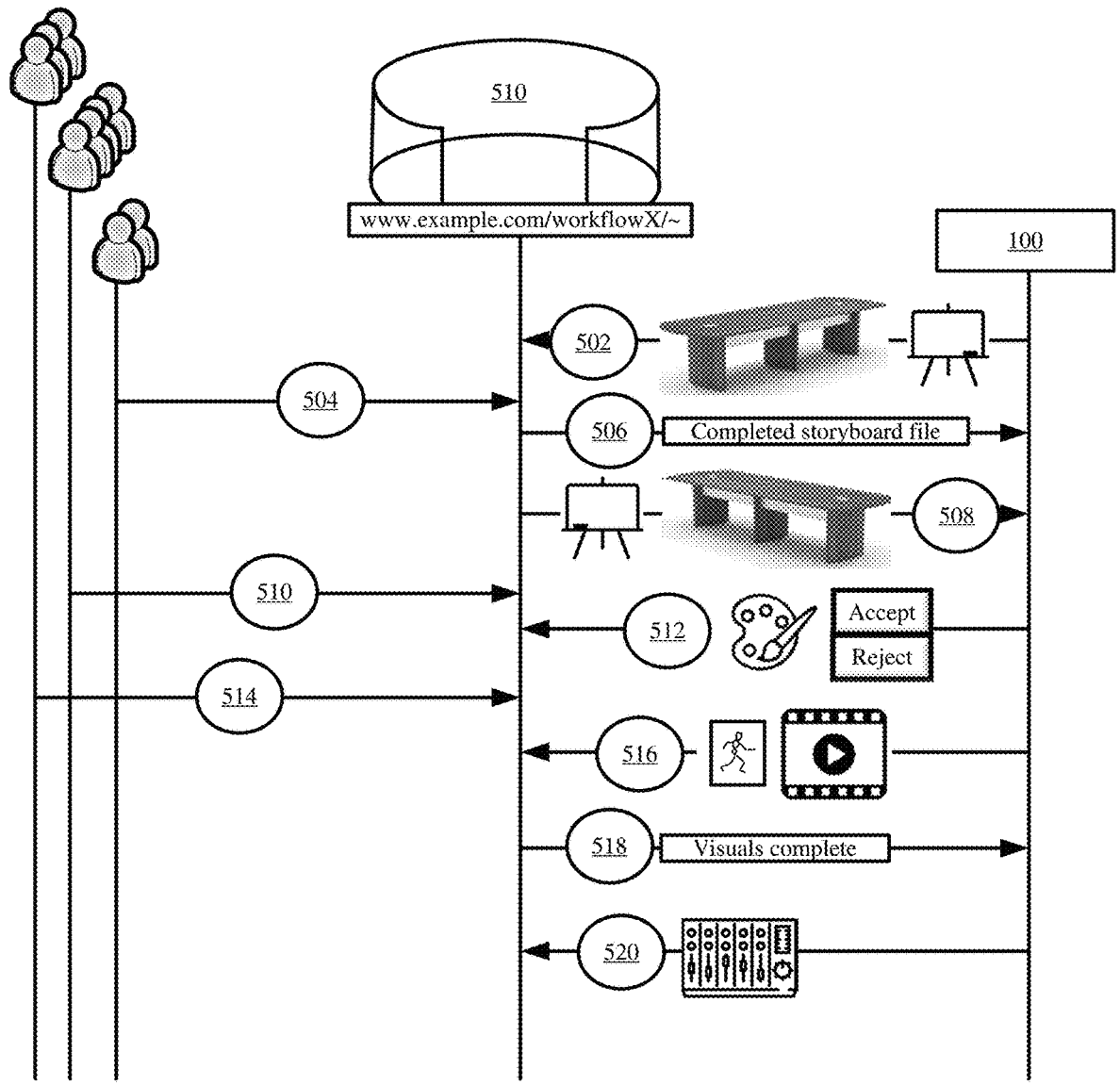
FIG. 5 illustrates an example for advancing through a particular workflow via an evolving or dynamically changing experience in accordance with some embodiments presented herein.

Instead of or in addition to generating new experiences based on metadata changes that result from user interactions with prior experiences, collaboration system 100 may dynamically and continually modify a particular experience over time as the different workflow tasks and/or actions are completed and/or different users access the particular experience. FIG. 5 illustrates an example for advancing through a particular workflow via an evolving or dynamically changing experience 500 in accordance with some embodiments presented herein.

Customized experience 500 may represent a virtualized room for different sets of users to collaborate on different tasks or actions of the particular workflow. Customized experience 500 may be generated within a VR environment. Users may freely move within the VR environment to select and/or interact with different tools that collaboration system 100 dynamically makes available within customized experience 500 based on workflow state and/or metadata. As one or more users join and leave customized experience 500 and/or as different tasks and/or actions are performed using the tools within customized experience 500, collaboration system 100 may dynamically alter customized experience 500.

Collaboration system 100 may initially populate (at 502) customized experience 500 with a first set of tools and a first set of actionable events for storyboarding. The first set of tools may include a virtualized whiteboard and conferencing equipment for a first set of users to collaborate on the storyboard. The first set of actionable events may include different permitted uses of the virtualized whiteboard and restrictions on the conferencing equipment. At this time, collaboration system 100 may allow a first set of users, that have storyboarding roles, access to customized experience 500.

The first set of users may collaborate (at 504) within customized experience 500 by seeing and/or hearing each other, and by using the first set of tools to generate the storyboards together. In other words, each user of the first set of users may, at the same time, use the first set of tools to add, modify, remove, and/or otherwise edit the storyboarding, and may discuss the edits in the same virtualized environment.

Collaboration system 100 may monitor the user interactions with customized experience 500 to determine when the storyboarding is complete. For instance, collaboration system 100 may detect (at 506) that a storyboard file has been created and has been approved by the first set of users using the first set of tools. Collaboration system 100 may update the particular workflow metadata. In doing so, collaboration system 100 may automatically remove (at 508) the first set of tools from customized experience 500, and may populate customized experience 500 with a second set of tools based on a next set of tasks or actions of the particular workflow that are to be executed after the storyboarding, and/or based on one or more of the first set of users accessing customized experience 500.

Collaboration system 100 may analyze the particular workflow to determine that pre-visualization, art production, and/or other tasks may be performed once the storyboarding is complete. Collaboration system 100 may detect (at 510) a second set of users with art production roles accessing customized experience 500, and may dynamically populate (at 512) customized experience 500 for the second set of users with a second set of tools and a second set of actionable events for art production. Collaboration system 100 may also provide the second set of users access to a second set of files that store the created artistic elements. Contemporaneously, collaboration system 100 may detect (at 514) a third set of users with pre-visualization roles accessing customized experience 500, and may dynamically populate (at 516) customized experience 500 for the third set of users with a third set of tools and a third set of actionable events for pre-visualization. Collaboration system 100 may also provide the third set of users access to a third set of files that store the resulting pre-visualization animations.

In some embodiments, the second set of users may not see, use, or access the third set of tools, third set of files, or collaborate with the third set of users, and the third set of users may not see, use, or access the second set of tools, second set of files, or collaborate with the second set of users. In this manner, collaboration system 100 may dynamically customize experience 500 with restricted access so that each set of users can focus on completing their collaborative tasks without interference from other users and without having access to tools that are unnecessary to the tasks at issue.

Collaboration system 100 may continue to monitor (at 518) changes that are made to the particular workflow based on user interactions with the second set of tools and the third set of tools. Collaboration system 100 may update (at 520) the second set of tools and/or the third set of tools with a sound mixing tool to allow the second set of users and the third set of users to collaborate on sound in response to determining that additional tasks of the particular workflow are complete, and that the particular workflow has progressed to a sound mixing stage.

Figure 6:
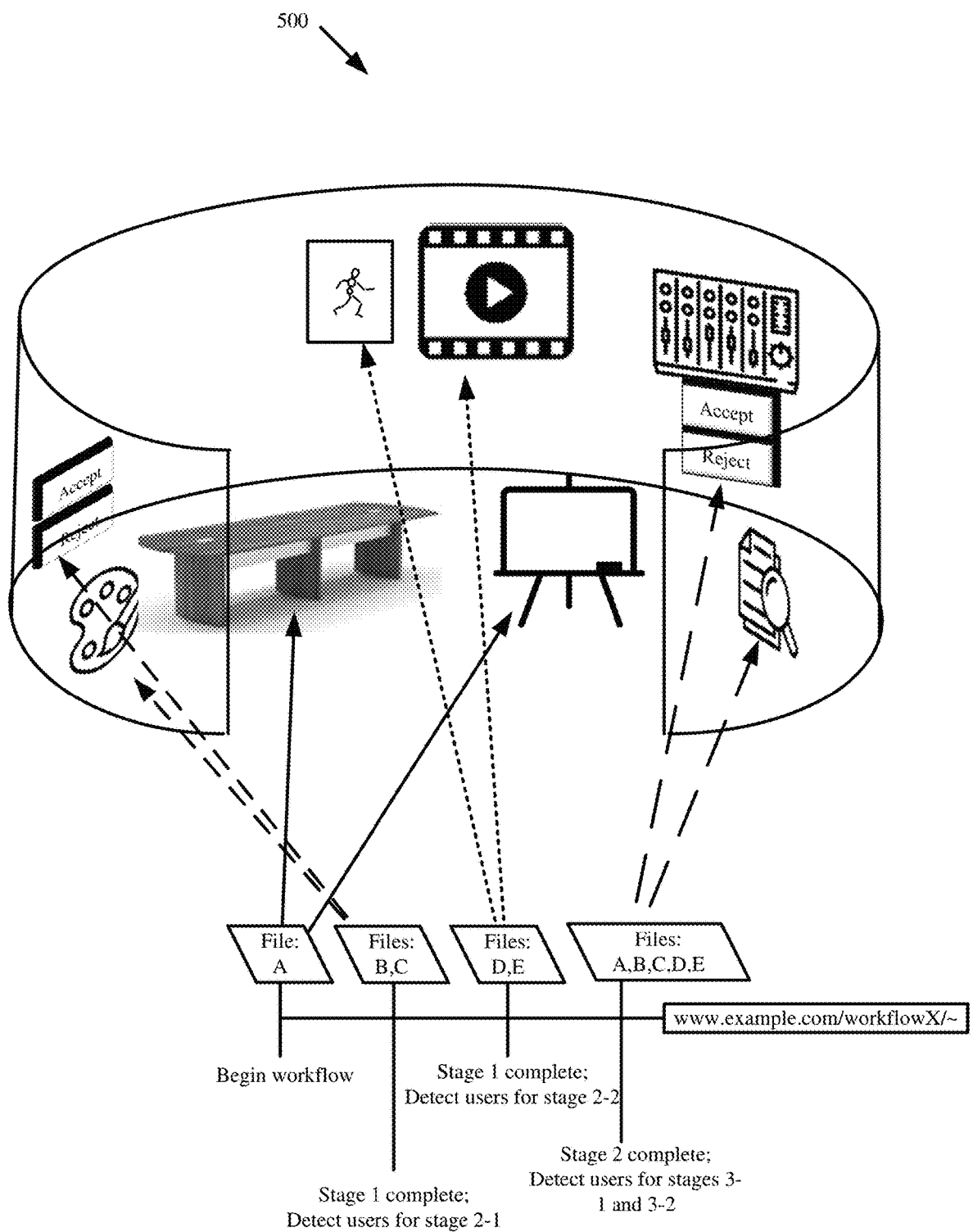
FIG. 6 illustrates an example of the collaboration system dynamically updating the customized experience in accordance with some embodiments presented herein.

FIG. 6 illustrates an example of collaboration system 100 dynamically updating customized experience 500 in accordance with some embodiments presented herein. FIG. 6 illustrates collaboration system 100 inserting and/or removing different sets of tools in customized experience 500, and providing access to different sets of files via customized experience 500 at different times based on the particular workflow state or progression that is tracked with the metadata, and further based on the users accessing customized experience 500.

Figure 7:
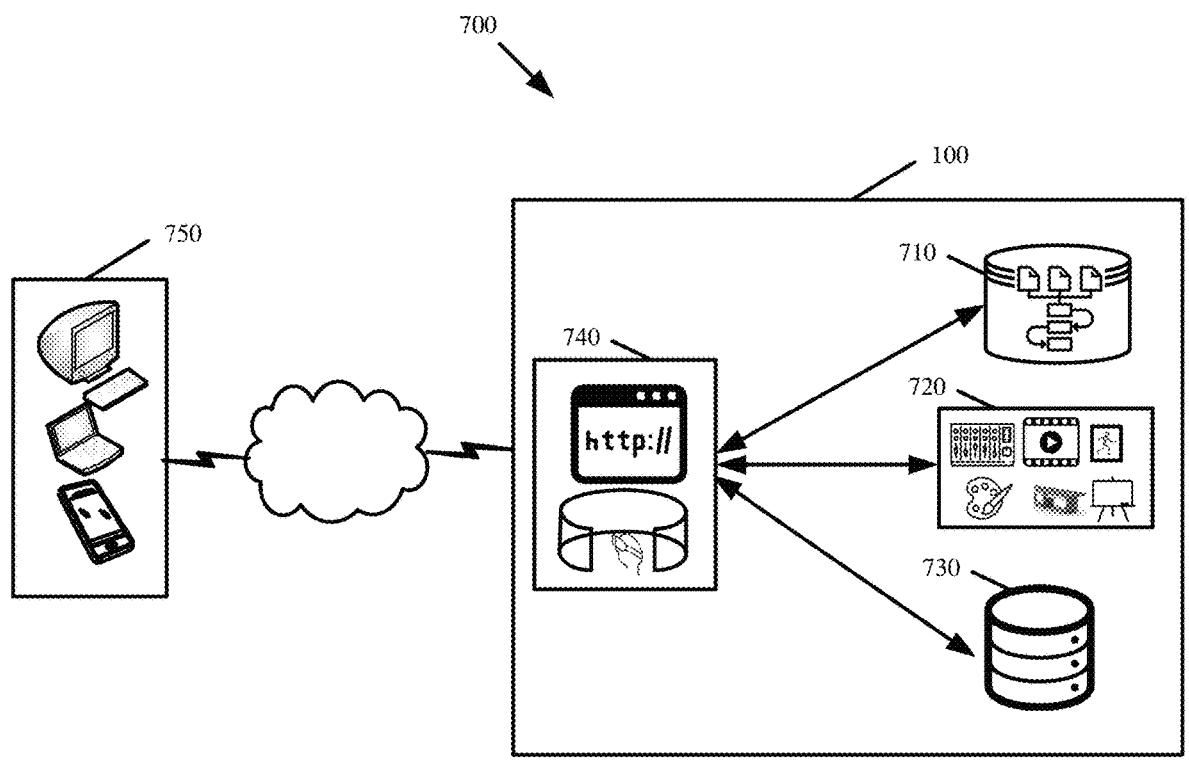
FIG. 7 illustrates an example architecture and components for the collaboration system in accordance with some embodiments presented herein.

FIG. 7 illustrates example architecture 700 and components for collaboration system 100 in accordance with some embodiments presented herein. Collaboration system 100 may include file repository 710, plurality of available tools 720, metadata store 730, and collaboration interface 740. User devices 750 may access collaboration system via a data network.

File repository 710 may include one or more storage devices that are used to retain the files and/or data of different workflows. The files of a particular workflow may be stored together. For example, the files of a particular workflow may be stored in a common directory or in a common container. File repository 710 may include on-premises storage of an office, business, or enterprise as well as off-premises storage that store the workflow files remotely on storage devices of third-party "cloud" service providers.

Plurality of available tools 720 may include virtual tools, interactive graphical elements, controls, software applications, and/or hardware resources for performing various tasks and/or actions of different workflows. Collaboration system 100 may select different sets of tools 720 to populate different experiences that are created for different workflows and different users at different times. For instance, collaboration system 100 may embed the tools in the website, VR environment, and/or other interface that users may use for workflow collaboration. Each tool may receive input based on user interactions, and may produce output that modifies one or more workflow files, advances workflow state, and/or changes workflow metadata.

Metadata store 730 may include a repository or database for storing the workflow metadata. In some embodiments, collaboration system 100 may store all metadata (e.g., share, file, user, and/or other metadata) for a particular workflow in metadata store 730. In some other embodiments, metadata store 730 may represent a distributed data store in which share metadata may be stored with the workflow container or data object, file metadata may be stored with the respective files, and user metadata may be stored in a separate file or location.

Collaboration interface 740 may include one or more interfaces from which the users access the different experiences. Collaboration interface 740 may be accessed at a particular URI, link, and/or other access identifier. In some embodiments, the same access identifier may be used to access the different experiences that are created for a particular workflow, and different access identifiers may be used to access experiences for different workflows. Collaboration interface 740 may be accessed via a data network and standardized network protocols (e.g., HyperText Transfer Protocol messages).

User devices 750 may correspond to one or more network-enabled devices for requesting, accessing, and/or interfacing with collaboration interface 740 and the different experiences created by collaboration system 100. More generally, user devices 750 may include devices with which different users may connect to collaboration system 100, may display or view the virtualized environments from the generated experiences provided by collaboration system 100, and/or may interact with the different tools provided in the generated experiences.

User devices 750 may include a portable computing and communication device, such as a personal digital assistant ("PDA"), a "smart" phone, a cellular phone, a laptop computer, a tablet computer, etc. User devices 750 may also include a non-portable computing device, such as a desktop computer, a consumer or business appliance, a "smart"

television, a set-top box, a gaming device, or another device that has the ability to connect to a wired or wireless network. User devices 750 may, in some embodiments, include a computing and communication device that may be worn by a user (also referred to as "wearable" devices) such as a watch, a fitness band, a necklace, glasses, a ring, a belt, a headset, and/or another type of wearable device.

In some embodiments, collaboration system 100 may dynamically adjust machine resources that are allocated with each customized experience. For instance, collaboration system 100 may determine the number of expected simultaneous users for a generated experience and/or the amount of compute, memory, network, and/or other machine resources needed to implement the tools and/or actionable events selected for the generated experience, and may adjust an amount of machine resources that are dedicated to run that experience. A first experience for editing high resolution video will require more machine resources than a second experience for document editing. Collaboration system 100 may allocate and/or reserve the machine resources for each experience from a cloud system provider. For instance, collaboration system 100 may calculate an amount of compute, memory, network, and/or other machine resources when generating a particular experience, may request those machine resources from the cloud system provider, may instantiate the experience as a container or other service that runs on the machine resources received from the cloud system provider, and may provide a link to access that experience running on the received machine resources to the users that are permitted access. In some embodiments, collaboration system 100 may host a pool of available networked accessible machines, and may dynamically allocate machine resources for each experience from those machines.

Figure 8:
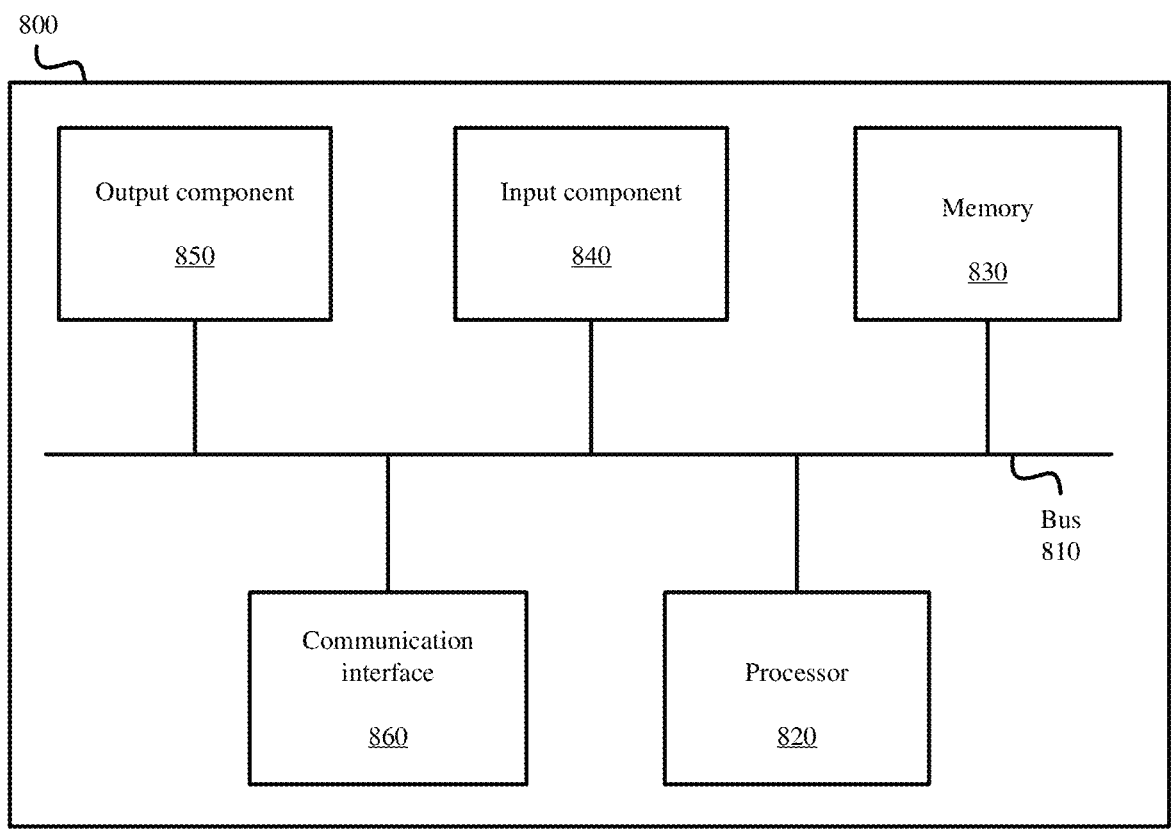
FIG. 8 illustrates example components of one or more devices, according to one or more embodiments described herein.

FIG. 8 is a diagram of example components of device 800. Device 800 may be used to implement one or more of the devices or systems described above (e.g., collaboration system 100, user devices 750, etc.). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc.

In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method for generating a collaborative virtual reality ("VR") environment for digital asset management, the method comprising:
   obtaining, via execution of one or more processors of a collaboration system, a workflow comprising a plurality of tasks that involve interacting with or modifying a plurality of files in a defined sequence by a plurality of different users via the collaborative VR environment;
   receiving, at the collaboration system, a plurality of requests that are issued over a data network to a particular Uniform Resource Identifier ("URI") by devices of the plurality of different users, wherein the particular URI is a network identifier for accessing the workflow;
   generating, by operation of the one or more processors, in response to the plurality of requests that are directed to the particular URI, a first experience based on first metadata from the workflow that is associated with a first set of the plurality of users, and a second experience based on second metadata from the workflow that is associated with a different second set of the plurality of users, wherein the first experience and the second experience comprise different collaborative VR environments that are accessible via the data network, wherein the first experience comprises a first set of tools with which the first set of users perform a first set of the plurality of tasks and modify a first set of the plurality of files, wherein the second experience comprises a second set of tools with which the second set of users perform a second set of the plurality of tasks and modify a different second set of the plurality of files, wherein each tool of the first set of tools and the second set of tools comprises one of a plurality of interactive graphical elements that are rendered as part of the collaborative VR environment and that correspond to different software for interacting with or modifying one or more of the plurality of files, and wherein each of the first set of users and the second set of users comprises two or more of the plurality of different users;
   presenting, from the collaboration system to devices of the first set of users via the data network, the first experience at the particular URI in response to a first set of the plurality of requests, wherein presenting the first experience comprises placing the first set of users in a first collaborative VR environment from which to interact with the first set of files using the first set of tools;
   presenting, from the collaboration system to devices of the second set of users via the data network, the second experience at the particular URI in response to a second set of the plurality of requests, wherein presenting the second experience comprises placing the second set of users in a second collaborative VR environment from which to interact with the second set of files using the second set of tools, that are different than the first set of tools; and
   dynamically modifying the second experience in response to a change in the second metadata or the second set of users, wherein dynamically modifying the second experience comprises changing the second set of tools by removing, inserting, enabling, or disabling one or more tools within the second experience.

2. The method of claim 1 further comprising:
   populating the first set of tools at different locations in the first collaborative VR environment;
   customizing a presentation of the first collaborative VR environment to match a first physical office space;
   populating the second set of tools at different locations in the second collaborative VR environment; and
   customizing a presentation of the second collaborative VR environment to match a second physical office space.

3. The method of claim 1,
   wherein generating the first experience comprises enabling a first set of actionable events executed with the first set of tools and disabling a second set of actionable events executed with the first set of tools based on the first metadata; and
   wherein generating the second experience comprises enabling a third set of actionable events executed with the second set of tools and disabling a fourth set of actionable events executed with the second set of tools based on the second metadata.

4. The method of claim 1 further comprising:
   restricting the second set of users from accessing the first experience using the particular URI or another URI based on user metadata of the second set of users differing from the first metadata; and
   restricting the first set of users from accessing the second experience using the particular URI or another URI based on user metadata of the first set of users differing from the second metadata.

5. The method of claim 1 further comprising:
determining that the second set of tasks are independent of a third set of the plurality of tasks, and that the second set of tasks and the third set of tasks are dependent on completion of the first set of tasks; and
providing a third set of the plurality of users collaborative access to a third set of the plurality of files through a third experience that is generated concurrently with the second experience based on the second metadata, wherein the third experience comprises a third set of tools with which the third set of users perform the third set of tasks and modify the third set of files at a same time as the second set of users performing the second set of tasks.

6. The method of claim 5,
wherein the second experience prevents the third set of users from interfering with the second set of users and modifying the second set of files; and
wherein the third experience prevents the second set of users from interfering with the third set of users and modifying the third set of files.

7. The method of claim 1 further comprising:
providing the particular URI as a common access identifier with which the first set of users and the second set of users access the workflow;
presenting the first experience in response to the first set of requests from the first set of users that are directed to the common access identifier during a first time that is before completion of the first set of tasks; and
presenting the second experience in response to the second set of requests from the second set of users that are directed to the common access identifier during a second time that is after completion of the first set of tasks.

8. The method of claim 1 further comprising:
selecting the first set of tools for the first experience based on the first metadata comprising a link between the first set of tools and the first set of files that are accessible from the first experience; and
selecting the second set of tools for the second experience based on the second metadata comprising a link between the second set of tools and the second set of files that are accessible from the second experience.

9. The method of claim 8 further comprising:
mapping the first metadata to the first set of tasks;
mapping the second metadata to the second set of tasks;
wherein the first set of tools are configured to perform different tasks of the first set of tasks; and
wherein the second set of tools are configured to perform different tasks of the second set of tasks.

10. The method of claim 1 further comprising:
determining a first state of the workflow based on the first metadata;
determining the first set of tasks to advance the workflow past the first state; and
selecting the first set of tools for the first experience based on the first set of tasks.

11. The method of claim 1 further comprising:
detecting the second set of users accessing the workflow at a particular time;
presenting the second experience to the second set of users in response to user metadata of the second set of users providing authorization to perform the second set of tasks;
detecting a third set of users accessing the workflow at the particular time; and preventing the third set of users from accessing the workflow at the particular time in response to user metadata of the third set of users not providing authorization to perform the third set of tasks.

12. The method of claim 1,
wherein dynamically modifying the second experience comprises:
detecting the second metadata changing as a result of a first task of the second set of tasks being completed; and
removing at least one tool of the second set of tools from the second experience and inserting a new tool in the second experience in response to completion of the first task.

13. The method of claim 1,
wherein dynamically modifying the second experience comprises:
detecting at least one user of the second set of users leaving the second experience and the at least one user being associated with a particular role;
removing at least one tool of the second set of tools, that is linked to the particular role, from the second experience as a result of the at least one user leaving the second experience and no remaining user of the second set of users being associated with the particular role; and
changing a presentation of the second experience that is provided to remaining users of the second set of users to exclude the at least one tool as a result of the at least one user leaving the second experience and no remaining user of the second set of users being associated with the particular role.

14. The method of claim 1,
wherein dynamically modifying the second experience comprises:
detecting a new user of the second set of users joining the second experience and the new user being associated with different user metadata than other users of the second set of users;
determining that the different user metadata activates a new tool that is not part of the second set of tools;
adding the new tool in the second experience in response to the new user joining the second experience with the second set of users; and
modifying a presentation of the second collaborative VR environment to include the new tool while the second collaborative VR environment is accessed by the second set of users.

15. The method of claim 1 further comprising:
selecting the first set of files to become accessible or editable within the first experience based on the first metadata comprising a link between the first set of files and the first set of tasks; and
selecting the second set of files to become accessible or editable within the second experience based on the second metadata comprising a link between the second set of files and the second set of tasks.

16. The method of claim 1 further comprising:
selecting the first set of files to become accessible or editable within the first experience based on the first metadata comprising a link between the first set of tools and the first set of files; and
selecting the second set of files to become accessible or editable within the second experience based on the second metadata comprising a link between the second set of tools and the second set of files.

17. The method of claim 1 further comprising:
selecting the first set of files to become accessible or editable within the first experience based on the first metadata corresponding to a first stage of the workflow and the first stage of the workflow linking to the first set of files; and
selecting the second set of files to become accessible or editable within the second experience based on the second metadata corresponding to a different second stage of the workflow and the second stage of the workflow linking to the second set of files.

18. The method of claim 1 further comprising:
selecting the second set of tasks for the second experience based on the second metadata comprising an entry that corresponds to a particular stage of the workflow at which the second set of tasks are performed;
selecting the second set of files to become accessible or editable within the second experience based on the particular stage of the workflow; and
wherein generating the second experience to include the second set of tools is based on a mapping of the second set of tools to the second set of tasks.

19. A system for generating a collaborative virtual reality ("VR") environment for digital asset management, the system comprising:
one or more processors configured to:
obtain a workflow comprising a plurality of tasks that involve interacting with or modifying a plurality of files in a defined sequence by a plurality of different users via the collaborative VR environment;
receive a plurality of requests that are issued over a data network to a particular Uniform Resource Identifier ("URI") by devices of the plurality of different users, wherein the particular URI is a network identifier for accessing the workflow;
generate in response to the plurality of requests that are directed to the particular URI, a first experience based on first metadata from the workflow that is associated with a first set of the plurality of users, and a second experience based on second metadata from the workflow that is associated with a different second set of the plurality of users, wherein the first experience and the second experience comprise different collaborative VR environments that are accessible via the data network, wherein the first experience comprises a first set of tools with which the first set of users perform a first set of the plurality of tasks and modify a first set of the plurality of files, wherein the second experience comprises a second set of tools with which the second set of users perform a second set of the plurality of tasks and modify a different second set of the plurality of files, wherein each tool of the first set of tools and the second set of tools comprises one of a plurality of interactive graphical elements that are rendered as part of the collaborative VR environment and that correspond to different software for interacting with or modifying one or more of the plurality of files, and wherein each of the first set of users and the second set of users comprises two or more of the plurality of different users;
present the first experience at the particular URI to devices of the first set of users in response to a first set of the plurality of requests, wherein presenting the first experience comprises placing the first set of users in a first collaborative VR environment from which to interact with the first set of files using the first set of tools;
present the second experience at the particular URI to devices of the second set of users in response to a second set of the plurality of requests, wherein presenting the second experience comprises placing the second set of users in a second collaborative VR environment from which to interact with the first set of files using the second set of tools, that are different than the first set of tools; and
dynamically modifying the second experience in response to a change in the second metadata or the second set of users, wherein dynamically modifying the second experience comprises changing the second set of tools by removing, inserting, enabling, or disabling one or more tools within the second experience.

20. A non-transitory computer-readable medium of a collaboration system used in generating a collaborative virtual reality ("VR") environment for digital asset management, the non-transitory computer-readable medium storing a plurality of processor-executable instructions to:
obtain, via execution of one or more processors of the collaboration system, a workflow comprising a plurality of tasks that involve interacting with or modifying a plurality of files in a defined sequence by a plurality of different users via the collaborative VR environment;
receive, at the collaboration system, a plurality of requests that are issued over a data network to a particular Uniform Resource Identifier ("URI") by device of the plurality of different users, wherein the particular URI is a network identifier for accessing the workflow;
generate, by operation of the one or more processors, in response to the plurality of requests that are directed to the particular URI, a first experience based on first metadata from the workflow that is associated with a first set of the plurality of users, and a second experience based on second metadata from the workflow that is associated with a different second set of the plurality of users, wherein the first experience and the second experience comprise different collaborative VR environments that are accessible via the data network, wherein the first experience comprises a first set of tools with which the first set of users perform a first set of the plurality of tasks and modify a first set of the plurality of files, wherein the second experience comprises a second set of tools with which the second set of users perform a second set of the plurality of tasks and modify a different second set of the plurality of files, wherein each tool of the first set of tools and the second set of tools comprises one of a plurality of interactive graphical elements that are rendered as part of the collaborative VR environment and that correspond to different software for interacting with or modifying one or more of the plurality of files, and wherein each of the first set of users and the second set of users comprises two or more of the plurality of different users;
present, from the collaboration system to devices of the first set of users via the data network, the first experience at the particular URI in response to a first set of the plurality of requests, wherein presenting the first experience comprises placing the first set of users in a first collaborative VR environment from which to interact with the first set of files using the first set of tools;

present, from the collaboration system to devices of the second set of users via the data network, the second experience at the particular URI in response to a second set of the plurality of requests, wherein presenting the second experience comprises placing the second set of users in a second collaborative VR environment from which to interact with the second set of files using the second set of tools, that are different than the first set of tools; and dynamically modifying the second experience in response to a change in the second metadata or the second set of users, wherein dynamically modifying the second experience comprises changing the second set of tools by removing, inserting, enabling, or disabling one or more tools within the second experience.

* * * * *